United States Patent
Zhou et al.

(10) Patent No.: US 12,264,094 B2
(45) Date of Patent: Apr. 1, 2025

(54) METHOD FOR CHROMIUM REMOVAL FROM POST-TANNING WASTEWATER

(71) Applicant: SICHUAN UNIVERSITY, Chengdu (CN)

(72) Inventors: Jianfei Zhou, Chengdu (CN); Liming Zhao, Jingmen (CN); Bi Shi, Chengdu (CN); Yuling Tang, Chegndu (CN)

(73) Assignee: SICHUAN UNIVERSITY, Chengdu (CN)

( * ) Notice: Subject to any disclaimer, the term of this patent is extended or adjusted under 35 U.S.C. 154(b) by 419 days.

(21) Appl. No.: 17/739,079

(22) Filed: May 7, 2022

(65) Prior Publication Data

US 2022/0289610 A1    Sep. 15, 2022

Related U.S. Application Data

(63) Continuation of application No. PCT/CN2021/109596, filed on Jul. 30, 2021.

(30) Foreign Application Priority Data

Mar. 10, 2021 (CN) .......................... 202110262082.7

(51) Int. Cl.
| | |
|---|---|
| *C02F 9/00* | (2023.01) |
| *C02F 1/52* | (2023.01) |
| *C02F 1/66* | (2023.01) |
| *C02F 1/68* | (2023.01) |
| *C02F 101/22* | (2006.01) |
| *C02F 101/30* | (2006.01) |
| *C02F 103/24* | (2006.01) |

(52) U.S. Cl.
CPC .................. *C02F 9/00* (2013.01); *C02F 1/52* (2013.01); *C02F 1/66* (2013.01); *C02F 1/683* (2013.01); *C02F 2101/22* (2013.01); *C02F 2101/308* (2013.01); *C02F 2103/24* (2013.01)

(58) Field of Classification Search
CPC .... C02F 9/00; C02F 1/683; C02F 1/32; C02F 1/48; C02F 1/72; C02F 1/46; C02F 1/52; C02F 1/66; C02F 1/56
See application file for complete search history.

(56) References Cited

U.S. PATENT DOCUMENTS 5,000,859 A    3/1991  Suciu et al.

FOREIGN PATENT DOCUMENTS

| CN | 101805052 A | 8/2010 | |
|---|---|---|---|
| CN | 102505057 A | 6/2012 | |
| CN | 109133408 A | 1/2019 | |
| CN | 112110563 A | * 12/2020 | ............ C02F 1/5236 |
| CN | 113044946 A | 6/2021 | |
| JP | H04131186 A | 5/1992 | |

OTHER PUBLICATIONS

CN-112110563-A Translation (Year: 2020).*
Yuling Tang, et al., Highly efficient removal of Cr(III)-poly(acrylic acid) complex by coprecipitation with polyvalent metal ions: Performance, mechanism, and validation, Water Research, 2020, pp. 1-10, vol. 178, 115807.
GB 30486-2013, Discharge standard of water pollutants for leather and fur making industry, 2013, pp. 1-6, State Environmental Protection Bureau; General Administration of Quality Supervision, Inspection and Quarantine of the People's Republic of China.
GB 11914-89, Water quality—Determination of the chemical oxygen demand—Dichromate method, 1990, pp. 280-283, State Environmental Protection Bureau.
GB 11901-89, Water quality—Determination of suspended substance—Gravimetric method, 1990, State Environmental Protection Bureau.
GB 11903-89, Water quality—Determination of colority, 1990, pp. 234-236, State Environmental Protection Bureau.

\* cited by examiner

*Primary Examiner* — Walter D. Griffin
*Assistant Examiner* — Cameron J Allen
(74) *Attorney, Agent, or Firm* — Bayramoglu Law Offices LLC

(57) ABSTRACT

A method for chromium removal from post-tanning wastewater includes the following steps: (a) mixing pretreated post-tanning wastewater with an induction reagent to allow an induction reaction; and (b) adjusting a pH of a mixture obtained after the induction reaction to higher than 7.0 for precipitation; where the induction reagent includes a soluble metal salt. In the treatment method of the present disclosure, pretreated post-tanning wastewater is mixed with an induction reagent, a small amount of neutral chromium complexes remaining in the wastewater are converted into cationic chromium complexes under the action of the induction reagent (that is, a charge property of the chromium complex is changed), and then a pH is adjusted for precipitation to remove chromium, which greatly improves the removal efficiency of chromium in wastewater.

16 Claims, No Drawings

METHOD FOR CHROMIUM REMOVAL FROM POST-TANNING WASTEWATER

CROSS REFERENCE TO THE RELATED APPLICATIONS

This application is a continuation application of the national phase entry of International Application No. PCT/CN2021/109596, filed on Jul. 30, 2021, which is based upon and claims priority to Chinese Patent Application No. 202110262082.7, filed on Mar. 10, 2021, the entire contents of which are incorporated herein by reference.

TECHNICAL FIELD

The present disclosure relates to the technical field of chromium-containing wastewater treatment, and in particular to a method for chromium removal from post-tanning wastewater.

BACKGROUND

Leather industry is a characteristic and preponderant industry in China and plays an indispensable role in national economy. However, a large amount of chrome-containing wastewater produced from leather processing has posed serious challenges to the sustainable development of the leather industry. Because Chinese National Standard GB 30486-2013 "Discharge standard of water pollutants for leather and fur making industry" required that the total chromium concentration of the tannery effluent at workshop outlet is below 1.5 mg/L, the key issue how to make the emission concentration of chromium in tannery wastewater stably meet the discharge standard has to be solved for the sustainable development of leather industry. According to the source of chromium and the characteristics of wastewater, chrome-containing wastewaters in leather industry are divided into two categories: comprehensive wastewater and processing wastewaters. Processing wastewaters include chrome tanning wastewater (with high concentration of chromium), chrome retanning wastewater (with high concentration of chromium) and post-tanning wastewater (with low concentration of chromium).

Up to now, mature and economical techniques have been developed for removing chromium from comprehensive wastewater, chrome tanning wastewater and chrome retanning wastewater. However, in the post-tanning process of leather making, a large amount of anionic post-tanning chemicals were used to endow a leather with more characteristics and improve the quality of the finished leather. Limited by the reaction characteristics of post-tanning chemicals and the chemical reaction equilibrium, some post-tanning chemicals cannot be absorbed and thus will enter the wastewater inevitably. At present, there is a lack of suitable methods for effectively removing chromium from post-tanning wastewater because of the residual large amounts of post-tanning chemicals in wastewater. However, an economical and practical chromium removal technology has not yet been developed for post-tanning wastewater due to its large volume (about 30% of total tannery wastewaters), high concentration of organics and low concentration of Cr (10-200 mg/L).

In view of this, the present disclosure is specifically proposed.

SUMMARY

The present disclosure is intended to provide a method for chromium removal in post-tanning wastewater, such as to solve the technical problem in the prior art that the chromium concentration in the treated post-tanning wastewater cannot meet the discharge requirements.

To achieve the above objective, the present disclosure adopts the following technical solutions:

A method for removing chromium from post-tanning wastewater is provided, including the following steps:

(a) mixing pretreated post-tanning wastewater with an induction reagent to allow an induction reaction;

(b) adjusting a pH of a mixture obtained after the induction reaction to higher than 7.0 for precipitation;

where the induction reagent includes a soluble metal salt.

In a specific embodiment of the present disclosure, metal ions in the soluble metal salt may be metal cations with bivalence or higher valence state. In a preferred embodiment of the present disclosure, the metal cations may include any one or more from the group consisting of aluminum ions, iron ions, titanium ions, and zirconium ions.

The metal cations with bivalence or higher valence state refer to at least one from the group consisting of metal cations with bivalence or higher valence state.

In a specific embodiment of the present disclosure, the induction reagent may include any one or more from the group consisting of a chloride, a sulfate, and a nitrate of the metal cation.

In the treatment method of the present disclosure, pretreated post-tanning wastewater is mixed with an induction reagent, residual neutral chromium complexes and anionic chromium complexes in wastewater are converted into cationic chromium complexes under the action of the induction reagent (that is, a charge property of the complexed chromium is changed), and then a pH of the mixture obtained after the induction reaction is adjusted for precipitation, which greatly improves the removal effect of chromium in wastewater.

In a specific embodiment of the present disclosure, in step (a), based on the metal ions in the soluble metal salt, a mass of the induction reagent may be 0.01% to 0.1%, preferably 0.01% to 0.03%, and more preferably 0.02% of a mass of the pretreated post-tanning wastewater.

Specifically, based on the metal ions in the soluble metal salt, a mass of the metal ions in the induction reagent added may be 0.01% to 0.1% of a mass of the pretreated post-tanning wastewater.

In a specific embodiment of the present disclosure, the induction reaction may be conducted at 20° C. to 60° C. for 0.5 hours to 4 hours. Further, the induction reaction may be conducted at 20° C. to 30° C. for 1 hour to 3 hours.

In a specific embodiment of the present disclosure, the pH of the mixture obtained after the induction reaction may be adjusted to higher than 7.0 using an alkali. Further, the pH of the mixture obtained after the induction reaction may be adjusted to 8.5 or higher and preferably 9 or higher.

In a specific embodiment of the present disclosure, the alkali may include any one or more from the group consisting of sodium hydroxide, sodium bicarbonate, and potassium hydroxide.

In a specific embodiment of the present disclosure, a method of the pretreatment may include: mixing post-tanning wastewater with a catiomic reagent, and subjecting a resulting mixture to solid-liquid separation (SLS) to collect a liquid; and further, the catiomic reagent includes, but is not limited to, any one or more from the group consisting of a dye-fixing agent ECO, a dye-fixing agent Goon 721, a dye-fixing agent RG-T400, JV-601A, a dye-fixing agent Y, a dye-fixing agent M, and a dye-fixing agent Feylorfix® 50.

In the present disclosure, the post-tanning wastewater is first pretreated with a dye-fixing agent, such that cationic groups in the cationic dye-fixing agent are combined with anionic pollutants in the wastewater to block hydrophilic groups of the anionic pollutants and reduce the hydrophilicity of the anionic pollutants, and thus precipitates are formed, which can effectively remove pollutants such as dyes, retanning agents, and fatliquoring agents in wastewater.

In a specific embodiment of the present disclosure, a mass of the dye-fixing agent may be 0.05% to 0.2% and preferably 0.05% to 0.1% of the mass of the post-tanning wastewater.

In a specific embodiment of the present disclosure, the treatment may be conducted as follows: stirring to allow a reaction at 20° C. to 30° C. for 20 min to 60 min.

In practice, a conventional SLS operation can be used to conduct SLS on the mixture obtained after the treatment. The SLS can be conducted by centrifugation, filtration, or the like. Specifically, a solid-liquid separator such as a centrifuge, a plate and frame filter press, and a fluidized bed separator can be used to conduct the SLS.

Compared with the prior art, the present disclosure has the following beneficial effects.

In the treatment method of the present disclosure, a dye-fixing agent is first added to post-tanning wastewater for pretreatment, and the added dye-fixing agent can react with pollutants such as dyes, retanning agents, and fatliquoring agents in wastewater to form precipitates through fixation, thereby removing these pollutants. The pretreated post-tanning wastewater is mixed with an induction reagent, and under the action of the induction reagent, the residual neutral chromium complexes in the wastewater are converted into cationic chromium complexes; and then a pH of the mixture obtained after the induction reaction is adjusted using an alkali for precipitation, which greatly improves the removal effect of chromium in the wastewater, and enables a total chromium concentration to reach the discharge standard of lower than 1.5 mg/L.

DETAILED DESCRIPTION OF THE EMBODIMENTS

Technical solutions of the present disclosure will be clearly and completely described below with reference to specific implementations. However, those skilled in the art will understand that the examples described below are merely some rather than all of the examples of the present disclosure, and the examples are only used to illustrate the present disclosure and should not be regarded as limiting the scope of the present disclosure. All other examples obtained by a person of ordinary skill in the art based on the examples of the present disclosure without creative efforts shall fall within the protection scope of the present disclosure. If no specific conditions are specified in the examples, the examples will be conducted according to conventional conditions or the conditions recommended by the manufacturer. All of the used reagents or instruments which are not specified with manufacturers are conventional, commercially-available products.

A method for chromium removal from post-tanning wastewater is provided, including the following steps:

(a) mixing pretreated post-tanning wastewater with an induction reagent to allow an induction reaction; and (b) adjusting a pH of a mixture obtained after the induction reaction to higher than 7.0 for precipitation;

where the induction reagent includes a soluble metal salt.

In a specific embodiment of the present disclosure, metal ions in the soluble metal salt may be metal cations with bivalence or higher valence state.

In a preferred embodiment of the present disclosure, the metal cations may include any one or more from the group consisting of aluminum ions, iron ions, titanium ions, and zirconium ions.

In a specific embodiment of the present disclosure, the induction reagent may include any one or more from the group consisting of a chloride, a sulfate, and a nitrate of the metal cation. For example, in practice, the induction reagent can be any one or more from the group consisting of aluminum chloride, iron chloride, titanium chloride, zirconium chloride, aluminum nitrate, iron nitrate, zirconium nitrate, aluminum sulfate, iron sulfate, and zirconium sulfate.

In the treatment method of the present disclosure, pretreated post-tanning wastewater is mixed with an induction reagent, residual neutral chromium complexes in wastewater are converted into cationic chromium complexes under the action of the induction reagent, and then a pH of the mixture obtained after the induction reaction is adjusted for precipitation, which greatly improves the removal effect of chromium in wastewater.

In a specific embodiment of the present disclosure, in step (a), based on the metal ions in the soluble metal salt, a mass of the induction reagent may be 0.01% to 0.1%, preferably 0.01% to 0.03%, and more preferably 0.02% of a mass of the pretreated post-tanning wastewater.

For example, in different embodiments, in step (a), based on metal ions in the soluble metal salt, a mass of the induction reagent may be 0.01%, 0.02%, 0.03%, 0.04%, 0.05%, 0.06%, 0.07%, 0.08%, 0.09%, and 0.1% of a mass of the pretreated post-tanning wastewater.

In practice, the induction reagent may be prepared into an aqueous solution and then added to the pretreated post-tanning wastewater. A concentration of the aqueous solution is not limited, as long as the induction reagent is dissolved.

In a specific embodiment of the present disclosure, the induction reaction may be conducted at 20° C. to 60° C. for 0.5 hours to 4 hours. Further, the induction reaction may be conducted at 20° C. to 30° C. for 1 hour to 3 hours.

For example, in different embodiments, the temperature of the induction reaction may be 20° C., 25° C., 30° C., 35° C., 40° C., 45° C., 50° C., 55° C., 60° C., or the like; and the time of the induction reaction may be 0.5 hours, 1 hour, 1.5 hours, 2 hours, 2.5 hours, 3 hours, 3.5 hours, 4 hours, and the like.

In practice, the induction reaction can be conducted at room temperature, which can further simplify the treatment process, reduce the energy consumption and the like.

In a specific embodiment of the present disclosure, the pH of the mixture obtained after the induction reaction may be adjusted to higher than 7.0 using an alkali. Preferably, the pH of the mixture obtained after the induction reaction may be adjusted to 8.5 or higher and preferably 9 or higher.

After the induction reaction, a charge property of the complex is changed, such that the complex is converted into a cationic chromium complex; and an alkali is added for precipitation, which can further improve the removal effect of the chromium complex.

In a specific embodiment of the present disclosure, the alkali may include any one or more from the group consisting of sodium hydroxide, sodium bicarbonate, and potassium hydroxide.

In a specific embodiment of the present disclosure, a method of the pretreatment may include: mixing post-tanning wastewater with a dye-fixing agent for treatment, and subjecting a resulting mixture to SLS to collect a liquid; and the dye-fixing agent includes, but is not limited to, any one or more from the group consisting of a dye-fixing agent ECO, a dye-fixing agent Goon 721, a dye-fixing agent RG-T400, JV-601A, a dye-fixing agent Y, a dye-fixing agent M, and a dye-fixing agent Feylorfix® 50.

In a specific embodiment of the present disclosure, a mass of the dye-fixing agent may be 0.05% to 0.2% and preferably 0.05% to 0.1% of the mass of the post-tanning wastewater.

For example, in different embodiments, a mass of the dye-fixing agent may be 0.05%, 0.06%, 0.07%, 0.08%, 0.09%, 0.1%, 0.12%, 0.14%, 0.16%, 0.18%, and 0.2% of a mass of the post-tanning wastewater.

In a specific embodiment of the present disclosure, the treatment may be conducted as follows: stirring to allow a reaction at 20° C. to 30° C. for 20 min to 60 min.

After the dye-fixing agent is mixed with the post-tanning wastewater for pretreatment, the dye-fixing agent can react with pollutants such as dyes, retanning agents, and fatliquoring agents in wastewater to form precipitates through fixation, then SLS is conducted to remove particulate matters.

In practice, a conventional SLS operation can be used to conduct SLS on the mixture obtained after the treatment. The SLS can be conducted by centrifugation, filtration, or the like. Specifically, a solid-liquid separator such as a centrifuge, a plate and frame filter press, and a fluidized bed separator can be used to conduct the SLS.

In a specific embodiment of the present disclosure, the various reagents used can be as follows, but are not limited to these:

dye-fixing agent ECO, Guangzhou Enrich Technologies Co., Ltd.;

dye-fixing agent Goon 721, Dongguan Goon Organosilicon Technology Co., Ltd.;

dye-fixing agent RG-T400, Weifang Ruiguang Chemical Co., Ltd.;

JV-601A, Dongguan Jervay Industrial Co., Ltd.;

dye-fixing agent Y, Dongguan Xiangtao High-tech Material Technology Co., Ltd.;

dye-fixing agent M, Zhejiang Jinshuangyu Chemical Co., Ltd.; and dye-fixing agent Feylorfix® 50, Jiangsu Feymer Technology Co., Ltd.

In the following examples, the "parts" in relation to usage all refer to parts by weight unless otherwise specified.

Example 1

A method for chromium removal from post-tanning wastewater was provided in this example, including the following steps:

(1) 1,000 parts of leather post-tanning wastewater were taken, 1 part of a dye-fixing agent ECO was added, and a resulting mixture was stirred to allow a reaction at room temperature for 30 min to obtain a reaction product;

(2) the reaction product obtained in step (1) was centrifuged using a continuous centrifuge at a rotational speed of 3,000 rpm, and a resulting supernatant was collected;

(3) 100 parts of the supernatant obtained in step (2) were taken, 0.1 part of aluminum chloride (in the form of an aluminum chloride aqueous solution with a mass concentration of 10%, including about 0.02 part of aluminum ions) was added, and a reaction was conducted at 25° C. for 2 hours to obtain a reaction product; and (4) a sodium hydroxide solution was added to the reaction product obtained in step (3) to adjust a pH to 9, a resulting mixture stood for 30 min, and a resulting liquid was collected.

Example 2

A method for chromium removal from post-tanning wastewater in this example was the same as in Example 1 except that: the aluminum ions in step (3) were replaced with iron ions at an equal mass (the iron ions were added in the form of an iron chloride aqueous solution with a mass concentration of 10%).

Example 3

A method for chromium removal from post-tanning wastewater in this example was the same as in Example 1 except that: the aluminum ions in step (3) were replaced with zirconium ions at an equal mass (the zirconium ions were added in the form of a zirconium chloride aqueous solution with a mass concentration of 10%).

Example 4

A method for chromium removal from post-tanning wastewater in this example was the same as in Example 1 except that: the aluminum ions in step (3) were replaced with titanium ions at an equal mass (the titanium ions were added in the form of a titanium chloride aqueous solution with a mass concentration of 10%).

Example 5

A method for chromium removal from post-tanning wastewater in this example was the same as in Example 1 except that: 0.01 part of aluminum ions was used instead of 0.02 part of aluminum ions in step (3) (which was added in the form of an aluminum chloride aqueous solution).

Example 6

A method for chromium removal from post-tanning wastewater in this example was the same as in Example 1 except that: 0.03 part of aluminum ions was used instead of 0.02 part of aluminum ions in step (3) (which was added in the form of an aluminum chloride aqueous solution).

Example 7

A method for chromium removal from post-tanning wastewater in this example was the same as in Example 1 except that: in step (3), 100 parts of the supernatant obtained in step (2) were taken, 0.02 part of aluminum ions was added, and a reaction was conducted at 30° C. for 1 hour to obtain a reaction product.

Example 8

A method for chromium removal from post-tanning wastewater in this example was the same as in Example 1 except that: in step (3), 100 parts of the supernatant obtained in step (2) were taken, 0.02 part of aluminum ions was added, and a reaction was conducted at 20° C. for 3 hours to obtain a reaction product.

Example 9

A method for chromium removal from post-tanning wastewater in this example was the same as in Example 1 except that: the sodium hydroxide in step (4) was replaced with potassium hydroxide.

Example 10

A method for chromium removal from post-tanning wastewater in this example was the same as in Example 1 except that: the sodium hydroxide in step (4) was replaced with sodium bicarbonate.

Example 11

A method for chromium removal from post-tanning wastewater in this example was the same as in Example 1 except that: the dye-fixing agent ECO in step (1) was replaced with a dye-fixing agent Y at an equal weight.

Example 12

A method for chromium removal from post-tanning wastewater in this example was the same as in Example 1 except that: the dye-fixing agent ECO in step (1) was replaced with a dye-fixing agent RG-T400 at an equal weight.

Example 13

A method for chromium removal from post-tanning wastewater in this example was the same as in Example 1 except that: the aluminum ions in step (3) were replaced with sodium ions at an equal mass (the sodium ions were added in the form of a sodium chloride aqueous solution with a mass concentration of 10%).

Example 14

A method for chromium removal from post-tanning wastewater in this example was the same as in Example 1 except that: the dye-fixing agent ECO in step (1) was replaced with a dye-fixing agent Goon721 at an equal weight.

Example 15

A method for chromium removal from post-tanning wastewater in this example was the same as in Example 1 except that: the dye-fixing agent ECO in step (1) was replaced with JV-601A at an equal weight.

Example 16

A method for chromium removal from post-tanning wastewater in this example was the same as in Example 1 except that: the dye-fixing agent ECO in step (1) was replaced with a dye-fixing agent M at an equal weight.

Example 17

A method for chromium removal from post-tanning wastewater in this example was the same as in Example 1 except that: the dye-fixing agent ECO in step (1) was replaced with Feylorfix® 50 at an equal weight.

Comparative Example 1

A method for chromium removal from post-tanning wastewater in this comparative example was the same as in Example 1 except that: the dye-fixing agent ECO in step (1) was replaced with polyaluminum chloride (PAC) at an equal weight.

Comparative Example 2

A method for chromium removal from post-tanning wastewater in this comparative example was the same as in Example 1 except that: the dye-fixing agent ECO in step (1) was replaced with polyferric sulfate (PFS) at an equal weight.

Comparative Example 3

Compared with Example 1, the induction reaction step was omitted in this comparative example, specifically:

(1) 1,000 parts of post-tanning wastewater were taken, 1 part of a dye-fixing agent ECO was added, and a resulting mixture was stirred to allow a reaction at room temperature for 30 min to obtain a reaction product;

(2) the reaction product obtained in step (1) was centrifuged using a continuous centrifuge at a rotational speed of 3,000 rpm, and a resulting supernatant was collected; and (3) 100 parts of the supernatant obtained in step (2) were taken, a sodium hydroxide solution was added to adjust a pH to 9, a resulting mixture stood for 30 min, and a resulting liquid was collected.

Comparative Example 4

A method for chromium removal from post-tanning wastewater was provided in this comparative example, including the following steps:

(1) 100 parts of post-tanning wastewater were taken, 0.1 part of aluminum chloride (in the form of an aluminum chloride aqueous solution with a mass concentration of 10%, including about 0.02 part of aluminum ions) was added, and a reaction was conducted at room temperature for 2 hours to obtain a reaction product; and (2) a sodium hydroxide solution was added to the reaction product obtained in step (2) to adjust a pH to 9, a resulting mixture stood for 30 min, and a resulting liquid was collected.

Experimental Example

In order to compare compositions of the final liquids obtained after the treatment of post-tanning wastewater in the examples and comparative examples of the present disclosure, the final liquids obtained after the treatment in the examples and comparative examples were tested, and test results are shown in Table 1.

The post-tanning wastewater raw solutions used in the examples and comparative examples were in the same batch, wherein in the untreated post-tanning wastewater raw solutions, a chemical oxygen demand (COD) concentration was 2,800 mg/L, a chromaticity was 1,200, a suspended solid (SS) concentration was 439 mg/L, and a chromium concentration was 105 mg/L.

TABLE 1

Composition test results of the final liquids obtained after different treatments

| Example No. | COD (mg/L) | SS (mg/L) | Chromaticity | Cr (mg/L) |
|---|---|---|---|---|
| Example 1 | 950 | 135 | 75 | 0.3 |
| Example 2 | 1270 | 156 | 110 | 1.2 |
| Example 3 | 1150 | 110 | 80 | 1.1 |
| Example 4 | 1090 | 89 | 65 | 0.9 |
| Example 5 | 1130 | 147 | 85 | 3.6 |
| Example 6 | 795 | 65 | 55 | 0.1 |
| Example 7 | 920 | 130 | 75 | 0.2 |
| Example 8 | 900 | 115 | 70 | 0.2 |
| Example 9 | 940 | 130 | 70 | 0.2 |
| Example 10 | 1050 | 140 | 90 | 0.4 |
| Example 11 | 1130 | 145 | 100 | 1.3 |
| Example 12 | 830 | 70 | 50 | 0.2 |
| Example 13 | 1570 | 235 | 140 | 10.8 |
| Example 14 | 870 | 125 | 60 | 0.6 |
| Example 16 | 910 | 140 | 75 | 0.5 |
| Example 17 | 930 | 130 | 70 | 0.3 |
| Comparative Example 1 | 1940 | 305 | 160 | 73.6 |
| Comparative Example 2 | 1725 | 270 | 145 | 68.7 |
| Comparative Example 3 | 1015 | 168 | 80 | 15.3 |
| Comparative Example 4 | 2180 | 325 | 170 | 84.7 |

The COD was determined according to the COD determination method of the national standard GB11914-89, the SS was determined according to the gravimetric standard for determination of suspended solids in water of the national standard GB 11901-1989, the chromaticity was determined according to the platinum-cobalt colorimetry of the national standard GB11903-89, and the chromium concentration was determined by an inductively coupled plasma-optical emission spectrometer (ICP-OES).

It can be seen from the data of the above examples and comparative examples that, by the treatment method where a pretreatment was conducted with a flocculant in the prior art and then an induction reaction was conducted, or a pretreatment was conducted with the dye-fixing agent of the present disclosure without an induction reaction, or an induction reaction was directly conducted without pretreatment, a liquid obtained after the treatment had a chromium content significantly higher than a chromium content in a liquid obtained after the treatment in the example of the present disclosure (that is, a chromium content in a liquid obtained after a pretreatment with a dye-fixing agent and then an induction reaction). It can be seen that, in the present disclosure, the dye-fixing agent is first used to pretreat wastewater, and then an induction reaction is conducted with an induction reagent; and the two steps obviously show a synergistic effect and can significantly reduce a chromium content in post-tanning wastewater.

Finally, it should be noted that the above examples are merely intended to describe the technical solutions of the present disclosure, rather than to limit the present disclosure. Although the present disclosure is described in detail with reference to the above examples, persons of ordinary skill in the art should understand that modifications may be made to the technical solutions described in the above examples or equivalent replacements may be made to some or all technical features thereof, which do not make the essence of corresponding technical solutions depart from the scope of the technical solutions in the examples of the present disclosure.

What is claimed is:

1. A method for chromium removal from post-tanning wastewater, comprising the following steps:
   (a) mixing pretreated post-tanning wastewater with an induction reagent comprising a soluble metal salt to allow an induction reaction, wherein based on metal ions in the soluble metal salt, a mass of the induction reagent is 0.01% to 0.1% of a mass of the pretreated post-tanning wastewater; and
   (b) adjusting a pH of a material obtained after the induction reaction to higher than 7.0 for precipitation.

2. The method according to claim 1, wherein metal ions in the soluble metal salt are metal cations with bivalence or higher valence state.

3. The method according to claim 2, wherein the metal cations comprise at least one selected from the group consisting of aluminum ions, iron ions, titanium ions, and zirconium ions.

4. The method according to claim 2, wherein the induction reagent comprises at least one selected from the group consisting of a chloride, a sulfate, and a nitrate of the metal cations.

5. The method according to claim 1, wherein in step (a), based on the metal ions in the soluble metal salt, the mass of the induction reagent is 0.01% to 0.03% of the mass of the pretreated post-tanning wastewater.

6. A method for chromium removal from post-tanning wastewater, comprising the following steps:
   (a) mixing pretreated post-tanning wastewater with an induction reagent to allow an induction reaction, wherein the induction reaction is conducted at 20° C. to 60° C. for 0.5 hours to 4 hours; and
   (b) adjusting a pH of a material obtained after the induction reaction to higher than 7.0 for precipitation;
   wherein the induction reagent comprises a soluble metal salt.

7. The method according to claim 6, wherein the induction reaction is conducted at 20° C. to 30° C. for 1 hour to 3 hours.

8. The method according to claim 1, wherein the pH of the material obtained after the induction reaction is adjusted to higher than 7.0 using an alkali.

9. The method according to claim 8, wherein the pH of the material obtained after the induction reaction is adjusted to 8.5 or higher.

10. The method according to claim 8, wherein the alkali comprises at least one selected from the group consisting of sodium hydroxide, sodium bicarbonate, and potassium hydroxide.

11. A method for chromium removal from post-tanning wastewater, comprising the following steps:
    (a) mixing pretreated post-tanning wastewater with an induction reagent to allow an induction reaction; and
    (b) adjusting a pH of a material obtained after the induction reaction to higher than 7.0 for precipitation:
    wherein the induction reagent comprises a soluble metal salt, and wherein a method of a pretreatment comprises: mixing post-tanning wastewater with a dye-fixing agent for a treatment, and subjecting a resulting mixture to a solid-liquid separation to collect a liquid.

12. The method according to claim 11, wherein the dye-fixing agent comprises at least one selected from the group consisting of a dye-fixing agent ECO, a dye-fixing agent Goon 721, a dye-fixing agent RG-T400, JV-601A, a dye-fixing agent Y, and a dye-fixing agent M.

13. The method according to claim 12, wherein a mass of the dye-fixing agent is 0.05% to 0.2% of a mass of the post-tanning wastewater.

14. The method according to claim 11, wherein a mass of the dye-fixing agent is 0.05% to 0.2% of a mass of the post-tanning wastewater.

15. The method according to claim 14, wherein the mass of the dye-fixing agent is 0.05% to 0.1% of the mass of the post-tanning wastewater.

16. The method according to claim 15, wherein the treatment is conducted as follows: stirring to allow a reaction at 20° C. to 30° C. for 20 min to 60 min.

\* \* \* \* \*